(12) United States Patent
Vannithamby et al.

(10) Patent No.: US 9,900,772 B2
(45) Date of Patent: Feb. 20, 2018

(54) SMALL DATA COMMUNICATIONS

(71) Applicant: INTEL IP CORPORATION, Santa Clara, CA (US)

(72) Inventors: Rath Vannithamby, Portland, OR (US); Ali Koc, Portland, OR (US); Maruti Gupti, Portland, OR (US); Jha Satish, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 66 days.

(21) Appl. No.: 14/782,784

(22) PCT Filed: Dec. 16, 2013

(86) PCT No.: PCT/US2013/075470
§ 371 (c)(1),
(2) Date: Oct. 6, 2015

(87) PCT Pub. No.: WO2014/182339
PCT Pub. Date: Nov. 13, 2014

(65) Prior Publication Data
US 2016/0029417 A1    Jan. 28, 2016

Related U.S. Application Data

(60) Provisional application No. 61/821,635, filed on May 9, 2013.

(51) Int. Cl.
*H04W 76/02* (2009.01)
*H04W 72/12* (2009.01)
(Continued)

(52) U.S. Cl.
CPC ........... *H04W 12/04* (2013.01); *H04L 5/0053* (2013.01); *H04L 27/0008* (2013.01);
(Continued)

(58) Field of Classification Search
CPC .. H04B 7/0413; H04B 7/0617; H04B 7/0626; H04B 7/0632; H04B 7/0639;
(Continued)

(56) References Cited

U.S. PATENT DOCUMENTS 8,892,029 B2 * 11/2014 Jiang ................. H04W 72/1252
455/11.1
8,917,682 B2 * 12/2014 Yang .................... H04L 1/0026
370/310

(Continued)

FOREIGN PATENT DOCUMENTS

WO    WO 2012/134099 A2    10/2012

OTHER PUBLICATIONS

3GPP TR 23.887, 3$^{rd}$ Generation Partnership Project (3GPP), Release 12, vol. SA WG2, No. V0.9.0, Apr. 24, 2013 (Apr. 24, 2013), pp. 1-121, XP050692449, [retrieved on Apr. 24, 2013].

*Primary Examiner* — Babar Sarwar
(74) *Attorney, Agent, or Firm* — Thorpe North & Western

(57) ABSTRACT

Technology for communicating a small data set between a user equipment (UE) and an evolved node B (eNB). A channel condition of a downlink channel with the eNB may be determined at the UE. A channel condition indication based on the channel condition may be communicated to the eNB. The small data may be transmitted to the eNB using a signaling radio bearer (SRB) when the channel condition is greater than a selected threshold.

21 Claims, 7 Drawing Sheets

(51) Int. Cl.
*H04W 12/04* (2009.01)
*H04W 52/02* (2009.01)
*H04L 12/26* (2006.01)
*H04W 4/00* (2018.01)
*H04L 5/00* (2006.01)
*H04W 72/04* (2009.01)
*H04W 24/02* (2009.01)
*H04W 72/10* (2009.01)
*H04L 27/00* (2006.01)
*H04W 88/02* (2009.01)
*H04L 27/36* (2006.01)

(52) U.S. Cl.
CPC ............. *H04L 43/16* (2013.01); *H04W 4/005* (2013.01); *H04W 24/02* (2013.01); *H04W 52/0209* (2013.01); *H04W 52/0216* (2013.01); *H04W 52/0229* (2013.01); *H04W 52/0235* (2013.01); *H04W 72/0406* (2013.01); *H04W 72/0413* (2013.01); *H04W 72/0453* (2013.01); *H04W 72/10* (2013.01); *H04W 72/12* (2013.01); *H04W 76/02* (2013.01); *H04W 76/023* (2013.01); *H04L 5/006* (2013.01); *H04L 27/362* (2013.01); *H04W 88/02* (2013.01); *Y02B 60/50* (2013.01)

(58) Field of Classification Search
CPC ... H04L 27/0008; H04L 27/18; H04L 27/362; H04L 43/16; H04L 5/0053; H04L 5/006; H04W 12/04; H04W 16/28; H04W 16/32; H04W 24/02
USPC ............ 455/404.2, 412.1–414.2, 418–422.1, 455/435.1–453, 456.1, 456.3, 464, 455/41.1–41.2, 552.1, 509; 370/328–332, 370/338, 341, 348
See application file for complete search history.

(56) References Cited

U.S. PATENT DOCUMENTS

| | | | | |
|---|---|---|---|---|
| 9,025,473 | B2* | 5/2015 | Ko | H04L 1/0026 370/252 |
| 2003/0210676 | A1* | 11/2003 | Wu | H04L 47/10 370/350 |
| 2008/0008212 | A1* | 1/2008 | Wang | H04B 7/2637 370/503 |
| 2008/0045231 | A1* | 2/2008 | Kuroda | H04L 1/0026 455/452.1 |
| 2008/0232240 | A1* | 9/2008 | Baum | H04L 5/0007 370/210 |
| 2008/0233963 | A1* | 9/2008 | Alanara | H04W 12/06 455/438 |
| 2009/0052388 | A1* | 2/2009 | Kim | H04W 74/002 370/329 |
| 2010/0103833 | A1* | 4/2010 | Englund | H04L 1/0026 370/252 |
| 2010/0111039 | A1* | 5/2010 | Kim | H04W 76/048 370/331 |
| 2010/0113082 | A1* | 5/2010 | Ishii | H04W 72/0406 455/509 |
| 2010/0254480 | A1 | 10/2010 | Park et al. | |
| 2010/0330995 | A1 | 12/2010 | Aoyama et al. | |
| 2012/0020319 | A1* | 1/2012 | Song | H04W 72/1231 370/330 |
| 2012/0088533 | A1* | 4/2012 | Khoshnevis | H04L 1/0026 455/509 |
| 2012/0163192 | A1* | 6/2012 | Bae | H04W 76/027 370/242 |
| 2013/0017779 | A1 | 1/2013 | Song et al. | |
| 2013/0028069 | A1* | 1/2013 | Pelletier | H04W 72/0453 370/216 |
| 2013/0035101 | A1* | 2/2013 | Wang | H04W 36/08 455/437 |
| 2013/0080597 | A1* | 3/2013 | Liao | H04W 4/005 709/219 |
| 2013/0136078 | A1* | 5/2013 | Bucknell | H04W 28/06 370/329 |
| 2013/0279343 | A1* | 10/2013 | Jeong | H04W 24/10 370/241 |
| 2013/0308545 | A1 | 11/2013 | Lee et al. | |
| 2014/0044029 | A1* | 2/2014 | Chou | H04W 52/0212 370/311 |
| 2014/0056243 | A1* | 2/2014 | Pelletier | H04W 74/04 370/329 |
| 2014/0169296 | A1* | 6/2014 | Zhang | H04L 5/0053 370/329 |
| 2014/0334371 | A1* | 11/2014 | Kim | H04W 52/0206 370/311 |
| 2014/0376471 | A1* | 12/2014 | Nishio | H04W 52/367 370/329 |
| 2016/0295473 | A1* | 10/2016 | Lee | H04W 36/023 |

\* cited by examiner

SMALL DATA COMMUNICATIONS

RELATED APPLICATIONS

The present application claims priority to U.S. Provisional Patent Application No. 61/821,635, filed May 9, 2013, the entire specification of which is hereby incorporated by reference in its entirety for all purposes.

BACKGROUND

In general, machine-to-machine (M2M) communication or Machine Type Communication (MTC) may refer to technologies that allow wireless and wired systems to communicate with other devices without any human intervention. A user equipment (UE) equipped for MTC (also known as an MTC device) may include, for example, a sensor or meter to collect information. The UE can communicate via a mobile network (e.g., wireless, wired, hybrid) with an MTC application server (e.g., software program) that can use or request data from the UE.

The expansion of mobile networks (e.g., broadband wireless access networks, wide area networks) across the world, along with the increased speed/bandwidth and reduced power of wireless communication, has facilitated the growth of MTC. Although the amount of data sent by UEs equipped for MTC is very small, a large number of these devices that are connected to a wireless network and used concurrently may increase a data load and overhead expense on a network. Therefore, current techniques for transmitting small data payloads (e.g., machine type communication data) may be inefficient or incompatible with emerging mobile networks.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
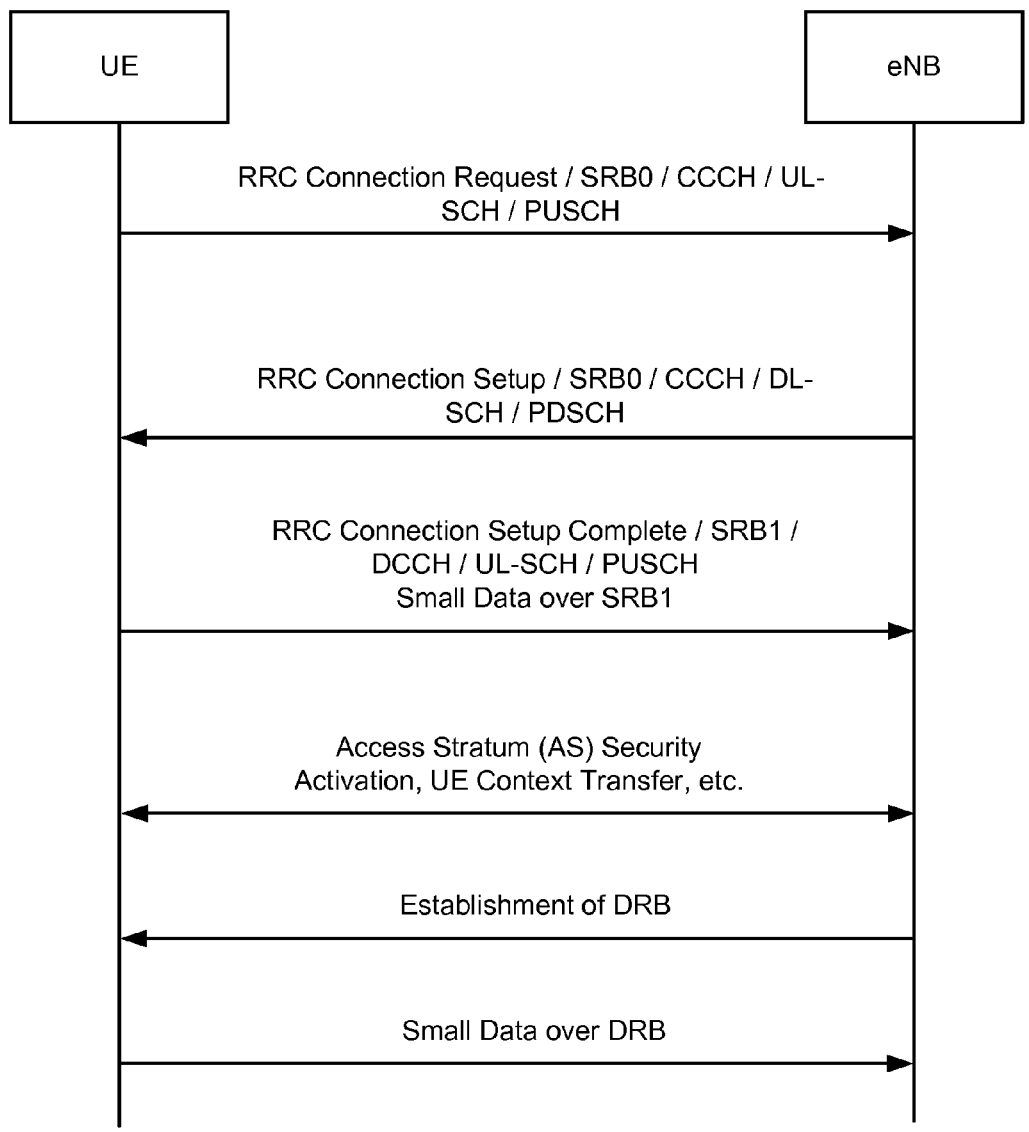
FIG. 1 is a diagram illustrating a radio resource control (RRC) connection setup procedure between a user equipment (UE) and an evolved node B (eNB) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

With a wide range of potential applications, Machine Type Communication (MTC) or Machine to Machine (M2M) communication has gained large interest among equipment vendors, mobile network operators, and MTC specialist companies. MTC is a form of data communication among one or more entities that does not necessarily need human interaction. Generally, a user equipment (UE) can be equipped for MTC. The UE equipped for MTC can also be known as an MTC device. The UE can communicate locally (e.g., wirelessly, through a personal area network (PAN), or hardwired) with other entities that provide the UE with data (e.g., a small data payload). Thereafter, the UE can process the data and then transmit the data to the MTC servers and/or other UEs that are equipped for MTC. The UEs can include health monitoring devices, smart meters, sensors, etc.

The UEs equipped for MTC can communicate (i.e., send or receive) small amounts of data over a network. The small amount of data typically ranges from a few bits to kilobits of data. The network can be a wireless wide area network (WWAN) or wireless local area network (WLAN) based on a selected radio access network (RAN) technology. The WWAN can be configured to operate based on a cellular networking standard such as IEEE 802.16 standard, commonly referred to as WiMAX (worldwide interoperability for microwave access), and the Third Generation Partnership Project (3GPP). Releases of the IEEE 802.16 standard include the IEEE 802.16e-2005, 802.16-2009, and 802.16m-2011. Releases of the 3GPP standard include the 3GPP LTE Release 8 in the fourth quarter of 2008, 3GPP LTE Advanced Release 10 in the first quarter of 2011, and 3GPP LTE Release 11 in the third quarter of 2012.

FIG. 1 is an exemplary diagram illustrating a radio resource control (RRC) connection establishment procedure between a user equipment (UE) and an evolved node B (eNB). The UE may communicate an RRC connection request message to the eNB over a signaling radio bearer (e.g., SRB0). The RRC connection request message may be communicated to the eNB over a common control channel (CCCH), uplink shared channel (UL-SCH), and/or physical uplink shared channel (PUSCH). In response to the RRC connection request message, the eNB may communicate an RRC connection setup message to the UE over the SRB0. The RRC connection setup message may be communicated to the UE over the CCCH, downlink shared channel (DL-SCH), and physical downlink shared channel (PDSCH). The UE may subsequently communicate an RRC connection setup complete message to the eNB over the SRB1. The RRC connection setup complete message may be communicated to the eNB over a dedicated control channel (DCCH), UL-SCH), and PUSCH. After the UE communicates the RRC connection setup complete message to the eNB, a plurality of steps may be performed between the UE and the eNB for access stratum security activation, UE context transfer, etc. The eNB may subsequently establish a data radio bearer (DRB) with the UE for the communication of data between the UE and the eNB over the DRB.

In one configuration, the SRB and/or the DRB may be used to communicate small data between the UE and the eNB. For example, the UE may communicate the small data to the eNB over the SRB (e.g., SRB1) in the RRC connection setup complete message. Alternatively, the UE may communicate the small data to the eNB over the DRB. The small data may typically range from a few bits to kilobits of data. However, small data communicated over the SRB (e.g., SRB1) may require less signaling overhead and reduced power consumption compared to communicating the small data over the DRB.

As shown in FIG. 1, the communication of the small data over the SRB1 may occur before access stratum (AS) security activation, UE context transfer, etc. are performed during the RRC connection establishment procedure. In contrast, the communication of the small data over the DRB may occur after access stratum (AS) security activation, UE context transfer, etc. are performed during the RRC connection establishment procedure. In other words, communicating the small data over the DRB would require additional steps to be performed as compared to communicating the small data over the SRB1. In some scenarios, the amount of signaling required for establishing the DRB between the UE and the eNB may be uneconomical in relation to the small amount of data that is being transmitted. In addition, UEs equipped for MTC may frequently send small amounts of data to the eNB, thereby requiring the DRB to be established each time the UE wishes to send the small data. Thus, the communication of the small data over the SRB1 may reduce signaling overhead and device power consumption as compared to communicating the small data over the DRB.

As discussed in further detail below, the UE may communicate the small data to the eNB over the SRB1 when a channel condition of the UE is greater than a selected threshold. When the channel condition of the UE is not greater than the selected threshold, then the UE may communicate the small data to the eNB over the DRB.

Figure 2:
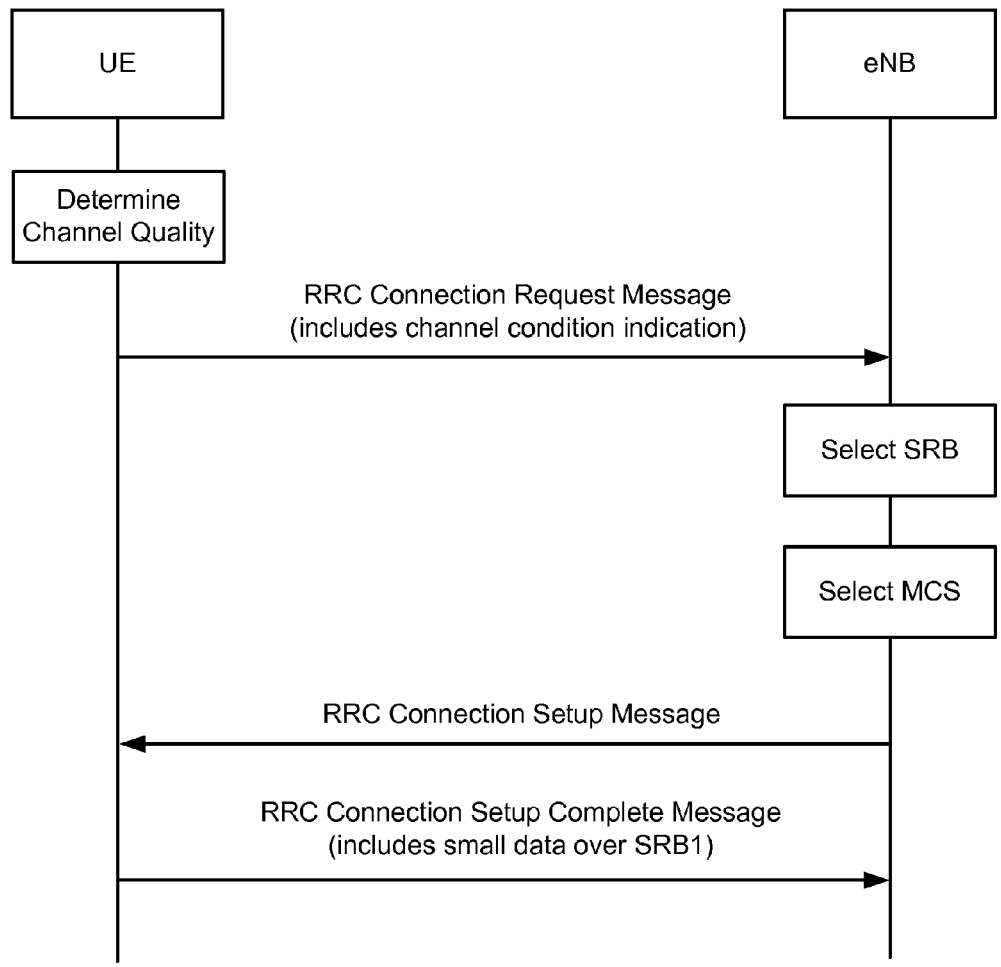
FIG. 2 is a diagram illustrating an evolved node B (eNB) selecting a signaling radio bearer (SRB) for small data communications between the eNB and a user equipment (UE) in accordance with an example.

FIG. 2 is a diagram illustrating an evolved node B (eNB) selecting a signaling radio bearer (SRB) for small data communications between the eNB and a user equipment (UE). In one example, the eNB may select the SRB (e.g., SRB1) when the channel condition of the UE is greater than the selected threshold. The UE may determine its channel condition (i.e., coverage quality). The UE may estimate its channel condition based on the downlink broadcast messages or reference signals received from the eNB. In other words, the UE may evaluate downlink common reference signals (CRS) that are received at the UE in order to determine the channel condition. Although the downlink channel quality may not provide an exact uplink channel quality for the UE, the downlink channel quality may provide an approximate indication of the uplink channel quality. In one example, the UE may determine the channel condition based on a power level associated with the downlink CRS. A higher power level associated with the downlink CRS may indicate a higher channel quality as compared to a lower power level associated with the downlink CRS which may indicate a lower channel quality.

The UE may communicate a channel condition indication to the eNB. In other words, the channel condition indication may be an indication of the UE's channel condition that is associated with a downlink communication from the eNB. In one example, the channel condition indication may be included in the RRC connection request message communicated to the eNB over the SRB0. The channel condition indication may include a "0" or a "1" depending on the channel quality of the UE. Thus, the channel condition indication may be a one-bit message from the UE to the eNB.

In one example, the UE may communicate the channel condition indication of "0" to indicate that the UE has a channel condition (or channel quality) that is greater than a selected threshold. In other words, the channel condition indication may be "0" when the power level associated with the downlink CRS is greater than the selected threshold. The channel condition indication of "0" may also indicate that the UE is located in proximity to a center region of the cell of the eNB. In other words, if the channel condition (i.e., power level associated with the CRS) is greater than the selected threshold, it can be presumed that the UE is located closer to the center region of the cell. The UE's channel quality may be stronger when the UE is located in proximity to the center region of the cell as opposed to being located in proximity to an edge region of the cell. In general, the channel condition indication of "0" indicates that the UE has a favorable channel condition or high channel quality.

In an alternative example, the UE may communicate the channel condition indication of "1" indicating that the UE has a channel condition (or channel quality) that is less than the selected threshold. In other words, the channel condition indication may be "1" when the power level associated with the downlink CRS is less than the selected threshold. The channel condition indication of "1" may also indicate that the UE is located in proximity to an edge region of the cell of the eNB. In other words, if the channel condition (i.e., power level associated with the CRS) is less than the selected threshold, it can be presumed that the UE is closer to the edge region of the cell. The UE's channel quality may be weaker when the UE is located in proximity to the edge region of the cell as opposed to being located in proximity to the center region of the cell. In general, the channel condition indication of "1" indicates that the UE has an unfavorable channel condition or poor channel quality.

In yet another example, the UE may communicate a last used downlink channel quality indicator (CQI) with the eNB. The last used downlink CQI may be included in the RRC connection request message. The CQI may include a suitable downlink transmission data rate, i.e., a Modulation and Coding Scheme (MCS) value. The CQI is a 4-bit integer and can be based on an observed signal-to-interference-plus-noise ratio (SINR) at the UE. The UE may communicate a CQI indicating "not applicable" or an appropriate new CQI when the UE has moved or changed conditions since the last used downlink CQI that was communicated to the eNB. Thus, the UE may store the last used downlink CQI that was previously communicated to the eNB for upcoming channel condition indication messages that are to be sent to the eNB. In addition, the UE may communicate various CQI values as described in the table below:

| CQI | Value | Meaning |
|---|---|---|
| 1 | 0000 | CQI Details - Modulation and Coding Scheme |
| 2 | 0001 | CQI Details |
|  | ... 1110 | RESERVED |
|  | 1111 | Not Applicable |

The eNB may receive the channel condition indication from the UE. As previously described, the channel condition indication may include CQI information (e.g., last used downlink CQI) or a channel quality associated with the UE (i.e., "0" or "1"). The eNB may select a radio bearer (RB) type for receiving small data from the UE based on the channel condition indication. The RB type may include the signaling radio bearer (e.g., SRB1) or the data radio bearer (DRB). In other words, the eNB may select the RB type and then the UE may communicate small data to the eNB using that RB type.

In the example shown in FIG. 2, the eNB may select the SRB1 when the channel condition indication received from the UE indicates that the UE's channel condition is "0" (i.e., the UE's channel condition is greater than the selected threshold or the UE is located in proximity to the center of the cell). In addition, the eNB may select the SRB1 when the channel condition indication received from the UE includes a last used downlink CQI that is greater than a selected threshold. The eNB may select the SRB1 when the UE's channel indication is "0," or when the last used downlink CQI is greater than the selected threshold, because the high channel quality of the UE may enable the small data to be successfully transmitted to the eNB over the SRB1. Unlike small data that is communicated over the DRB, the SRB1 does not allow the eNB to acknowledge that the small data was received from the UE. In other words, if the UE is unsuccessful in communicating the small data to the eNB over the SRB1, the UE may not be notified that the small data was not successfully received at the eNB. As a result, the UE may not know to resend the small data to the eNB. Therefore, when the UE's channel quality is high (i.e., a "0") and the small data is more likely to be received at the eNB, the eNB may select the SRB1 for receiving small data communications from the UE in order to reduce power and signaling overhead (as opposed to the increased signaling overhead when sending the small data over the DRB). As discussed in further detail below, the UE may select the DRB when the channel condition indication received from the UE indicates that the UE's channel condition is "1" or the CQI received from the UE is below a selected threshold.

In one example, the eNB may select a modulation and coding scheme (MCS) for receiving the small data communications from the UE over the SRB1. In general, the MCS may define the downlink transmission data rate for the communications between the UE and the eNB. The MCS may contain an MCS index ranging from 0 to 31. The UE may utilize the MCS index for communicating a specific transport block (i.e., higher layer data packets). The MCS index may represent a certain modulation order and transport block size index. The transport block size index may be used to compute a size of the transport block for a given resource block allocation. In addition, each MCS index may be associated with a number of spatial streams, a modulation type, and a coding rate. The spatial streams may range from 1 to 4. The modulation type may include a binary phase-shift keying (BPSK) modulation scheme, a quadrature phase-shift keying (QPSK) modulation scheme, or a quadrature amplitude modulation (QAM) scheme (i.e., 16-QAM, 64-QAM). The coding rate may a ratio between the transport block size and a total number of physical layer bits per subframe that are available for transmission of that transport block.

In one example, the UE may store a last used uplink MCS. The UE may communicate the last used uplink MCS with the channel condition indication in the RRC connection request message. The eNB may use the last used uplink MCS when selecting the MCS for receiving the small data communications from the UE over the SRB1.

The eNB may select the MCS to update conservative modulation and coding schemes that are typically used to communicate RRC signaling messages over the SRB1 (i.e., messages that do not contain small data). The conservative MCS may be used for the SRB1 due to its robust reception and the fact that the UE's channel condition and location is unknown at the eNB when the SRB1 is established between the eNB and the UE. However, communicating the small data using the conservative MCS may be undesirable when the UE's channel quality is high (i.e., the channel condition indication is a "0" or the last used downlink CQI is greater than the selected threshold). Therefore, the eNB may reconfigure a higher order MCS for the small data communication, rather than using the conservative MCS, when the UE's channel quality is high. If the UE's channel quality is poor (i.e., the channel condition indication is a "1" or the last used downlink CQI is less than the selected threshold), then the eNB may not reconfigure the MCS and continue to use the conservative MCS. In one example, the eNB may reconfigure a QPSK modulation scheme into a higher-order QAM modulation scheme when the UE has a high channel quality in order to increase the efficiency of the small data communication.

The eNB may communicate the reconfigured MCS to the UE in an RRC connection setup message. In addition, the RRC connection setup message may indicate that the UE can send small data to the eNB over the SRB1. Thereafter, the UE may send the small data to the eNB in an RRC connection setup complete message over the SRB1. By communicating the small data over the SRB1, a significant number of steps may be eliminated and the UE's level of power consumption may be decreased.

In general, the UE may communicate small data that is less than approximately 1500 bytes. Since the UE may be equipped for machine type communication (MTC), the UE may include numerous types of devices, such as smart parking meters, connected vehicular sensors, etc. Thus, the UE may include or not include a touch sensitive screen display, microphone, speaker, graphics processor, etc. The small data communicated from the UE may be related to numerous types of measurements, such as time information, speed information, temperature information, etc.

Figure 3:
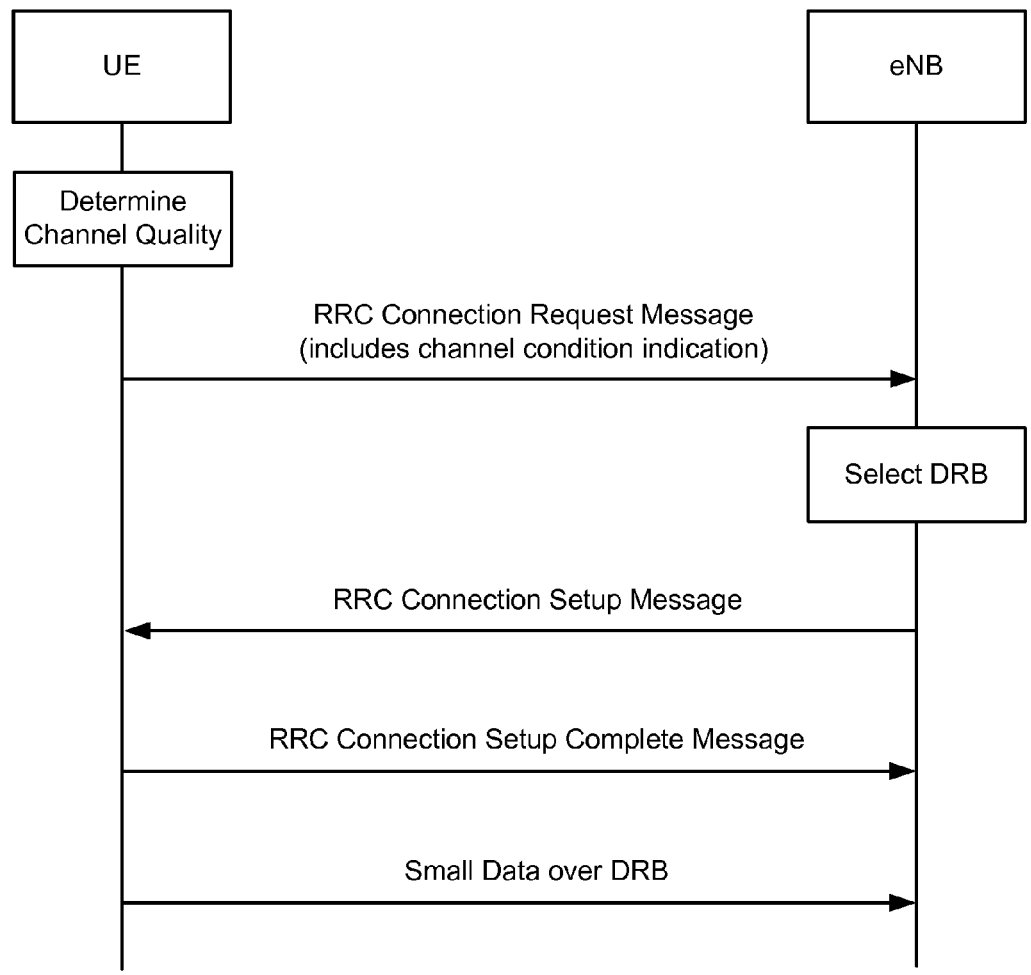
FIG. 3 is a diagram illustrating an evolved node B (eNB) selecting a data radio bearer (DRB) for small data communications between the eNB and a user equipment (UE) in accordance with an example.

FIG. 3 is a diagram illustrating an evolved node B (eNB) selecting a data radio bearer (DRB) for small data communications between the eNB and a user equipment (UE). The UE may determine its channel condition (i.e., coverage quality) based on the downlink broadcast messages or reference signals received from the eNB. In one example, the UE may determine the channel condition based on a power level associated with downlink common reference signals (CRS) received from the eNB.

The UE may communicate the channel condition indication in a one-bit message to the eNB. In one example, the channel condition indication may be included in the RRC connection request message communicated to the eNB over the SRB0. As previously discussed, the channel condition indication may be "0" when the UE's channel quality is greater than the selected threshold. In other words, the channel condition indication may be "0" when the power level associated with the downlink CRS is greater than the selected threshold. The channel condition indication of "0" may also indicate that the UE is located in proximity to a center region of the cell of the eNB. In an alternative example, the channel condition indication may be "1" when the UE's channel quality is less than the selected threshold. In other words, the channel condition indication may be "1" when the power level associated with the downlink CRS is less than the selected threshold. In yet another example, the channel condition indication may include the last used downlink channel quality indicator (CQI) with the eNB. The eNB may receive the channel condition indication from the UE and select a radio bearer (RB) type (i.e., the SRB1 or DRB) for receiving small data from the UE based on the channel condition indication.

In the example shown in FIG. 3, the eNB may select the DRB when the channel condition indication received from the UE indicates that the UE's channel condition or channel quality is "1" (i.e., the UE's channel condition is less than the selected threshold or the UE is located in proximity to the center of the cell). In addition, the eNB may select the DRB when the channel condition indication received from the UE includes a last used downlink CQI that is less than a selected threshold. The eNB may select the DRB when the UE's channel indication is "1," or when the last used downlink CQI is less than the selected threshold, because the poor channel quality of the UE may result in an unsuccessful transmission of the small data if using the SRB1. Unlike small data that is communicated over the SRB1, the DRB allows the eNB to acknowledge that the small data was successfully received from the UE. In other words, if the UE is unsuccessful in communicating the small data to the eNB over the DRB, the UE may be notified that the small data was not successfully received at the eNB. As a result, the UE may resend the small data to the eNB. Therefore, when the UE's channel quality is poor (i.e., a "1") and the small data is less likely to be received at the eNB, the eNB may select the DRB for receiving small data communications from the UE. Although selecting the DRB may increase the amount of signaling required for communicating the small data from the UE to the eNB, using the DRB offers a greater likelihood that the small data will be successfully communicated to the eNB as compared to using the SRB1.

In one example, the eNB may not reconfigure the conservative MCS when the small data is communicated to the eNB over the DRB. Based on the channel condition indication, the eNB may indicate to the UE in the RRC connection setup message that the UE can send the small data over the DRB. After additional step are performed during the RRC connection establishment procedure (e.g., access stratum security activation, UE context transfer), the UE may send the small data to the eNB over the DRB.

Figure 4:
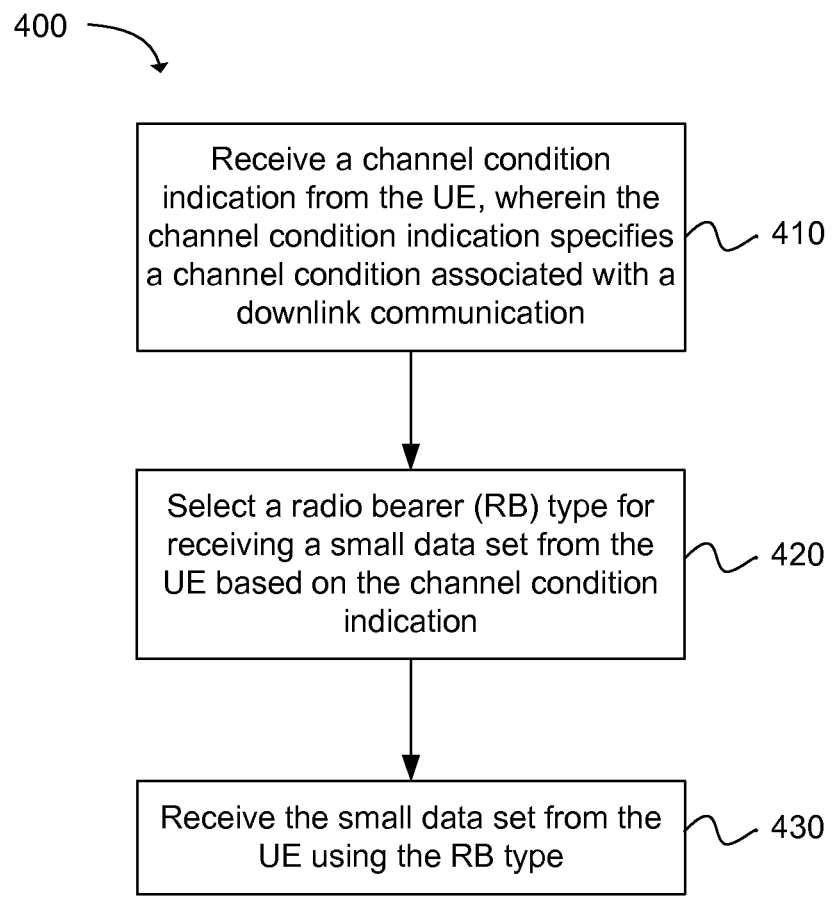
FIG. 4 depicts functionality of computer circuitry of a node operable to support small data communications with a user equipment (UE) in accordance with an example.

Another example provides functionality 400 of computer circuitry of a node operable to support small data communications with a user equipment (UE), as shown in the flow chart in FIG. 4. The functionality may be implemented as a method or the functionality may be executed as instructions on a machine, where the instructions are included on at least one computer readable medium or one non-transitory machine readable storage medium. The computer circuitry can be configured to receive a channel condition indication from the UE, wherein the channel condition indication specifies a channel condition associated with a downlink communication, as in block 410. The computer circuitry can be further configured to select a radio bearer (RB) type for receiving a small data set from the UE based on the channel condition indication, as in block 420. In addition, the computer circuitry can be configured to receive the small data set from the UE using the RB type, as in block 430.

In one configuration, the computer circuitry can be further configured to select a signaling radio bearer (SRB) or a data radio bearer (DRB) for receiving the small data set from the UE based on the channel condition indication. In addition, the computer circuitry can be further configured to select the SRB for receiving the small data set from the UE when the channel condition indication received from the UE is a "0" indicating that the UE is located in proximity to a center region of the cell of the node. Furthermore, the computer circuitry can be further configured to select the SRB for receiving the small data set from the UE when the channel condition indication received from the UE is a "0" indicating that the UE has a channel condition that is greater than a selected threshold.

In one example, the computer circuitry can be further configured to select the DRB for receiving the small data set from the UE when the channel condition indication received from the UE is a "1" indicating that the UE is located in proximity to an edge region of the cell of the node. In addition, the computer circuitry can be further configured to select the DRB for receiving the small data set from the UE when the channel condition indication received from the UE is a "1" indicating that the UE has a channel condition that is less than the selected threshold. Furthermore, the computer circuitry can be further configured to select a modulation and coding scheme (MCS) for receiving the small data set on the SRB based on the channel condition indication received from the UE.

In one example, the MCS is selected from one of: a binary phase-shift keying (BPSK) modulation scheme, a quadrature phase-shift keying (QPSK) modulation scheme, or a quadrature amplitude modulation (QAM) scheme. In addition, the computer circuitry can be further configured to select the SRB for receiving the small data set from the UE based on a last used downlink channel quality indicator (CQI) included in the channel condition indication from the UE.

In one configuration, the computer circuitry can be further configured to receive the channel condition indication in a radio resource control (RRC) connection request message from the UE. In one example, the small data set is less than approximately 1500 bytes. In an additional example, the node is selected from a group consisting of a base station (BS), a Node B (NB), an evolved Node B (eNB), a baseband unit (BBU), a remote radio head (RRH), a remote radio equipment (RRE), or a remote radio unit (RRU).

Figure 5:
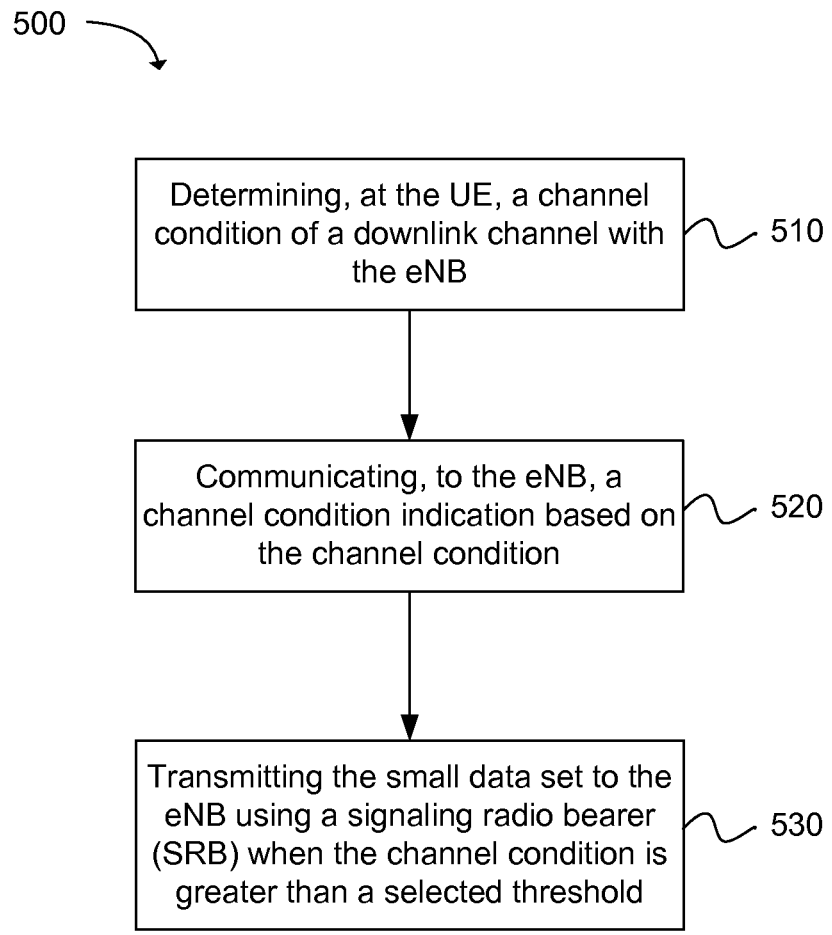
FIG. 5 depicts a flow chart of a method for communicating a small data set between a user equipment (UE) and an evolved node B (eNB) in accordance with an example.

Another example provides a method 500 for communicating a small data set between a user equipment (UE) and an evolved node B (eNB), as shown in the flow chart in FIG. 5. The method may be executed as instructions on a machine, where the instructions are included on at least one computer readable medium or one non-transitory machine readable storage medium. The method includes the operation of determining, at the UE, a channel condition of a downlink channel with the eNB, as in block 510. The method can include the operation of communicating, to the eNB, a channel condition indication based on the channel condition, as in block 520. The method can further include the operation of transmitting the small data set to the eNB using a signaling radio bearer (SRB) when the channel condition is greater than a selected threshold, as in block 530.

In one example, the method further comprises transmitting the small data set to the eNB using the SRB when the channel condition indicates that the UE is located in proximity to a center region of a cell of the eNB. In addition, the method further comprises transmitting the small data set to the eNB over the SRB using a modulation and coding scheme (MCS) that is selected by the eNB based on the channel condition indication.

In one configuration, the method further comprises communicating, to the eNB, a last used downlink channel quality indicator (CQI) associated with the UE in the channel condition indication; and transmitting the small data set to the eNB using the SRB based on the last used downlink CQI in the channel condition indication. In addition, the method further comprises transmitting the small data set to the eNB using a data radio bearer (DRB) when the channel condition is less than the selected threshold.

In one configuration, the method further comprises transmitting the small data set to the eNB using a data radio bearer (DRB) when the channel condition indicates that the UE is located in proximity to an edge region of a cell of the eNB. In addition, the method further comprises communicating, to the eNB, the channel condition indication in a radio resource control (RRC) connection request message. In one example, the UE includes an antenna, a touch sensitive display screen, a speaker, a microphone, a graphics processor, an application processor, internal memory, or a non-volatile memory port.

Figure 6:
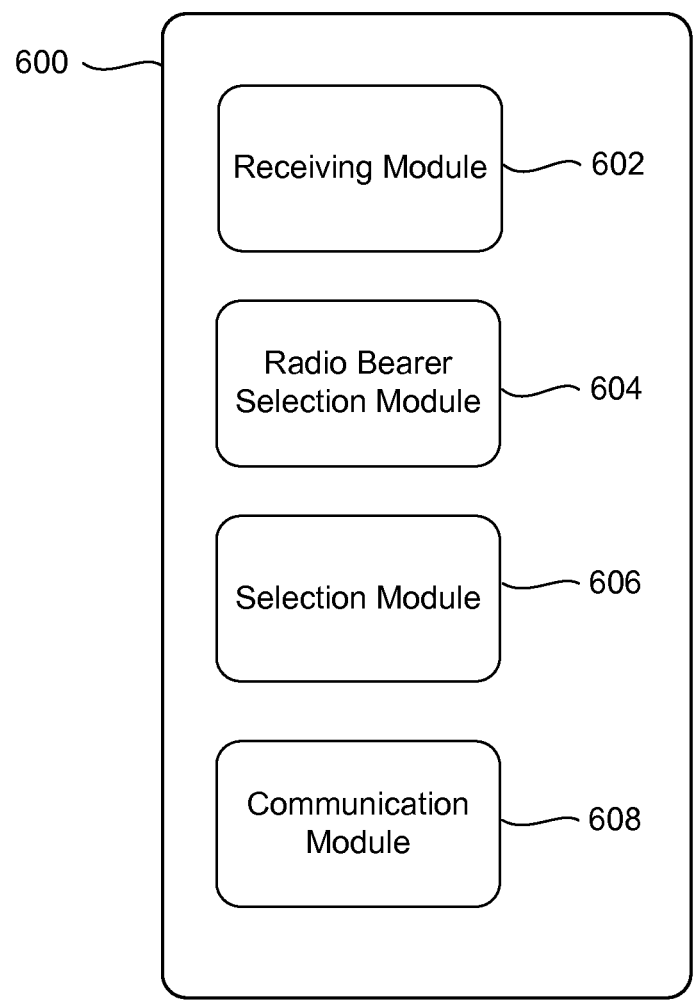
FIG. 6 depicts a small data communication module at an evolved node B operable to support communications of small data with a user equipment (UE) in accordance with an example.

Another example provides a small data communication module 600 at an evolved node B operable to support communications of small data with a user equipment (UE), as shown in the flow chart in FIG. 6. The small data communication module 600 may include a receiving module 602 configured to receive a channel condition indication from the UE, wherein the channel condition indication specifies a channel condition associated with a downlink communication. The small data communication module 600 may include a radio bearer selection module 604 configured to select a signaling radio bearer (SRB) for communicating the small data to the UE when the channel condition is greater than a selected threshold. The small data communication module 600 may further include a selection module 606 configured to select a modulation and coding scheme (MCS) for communicating the small data over the SRB with the UE. In addition, the small data communication module 600 may include a communication module 608 configured to communicate the small data with the UE over the SRB using the MCS.

In one example, the radio bearer selection module 604 is further configured to select the SRB for communicating the small data to the UE when the channel condition indicates that the UE is located in proximity to a center region of a cell of the eNB. In another example, the receiving module 602 is further configured to receive the channel condition indication in a radio resource control (RRC) connection request message from the UE. In yet another example, the selection module 606 is further configured to select a higher order MCS for communicating the small data on the SRB with the UE.

Figure 7:
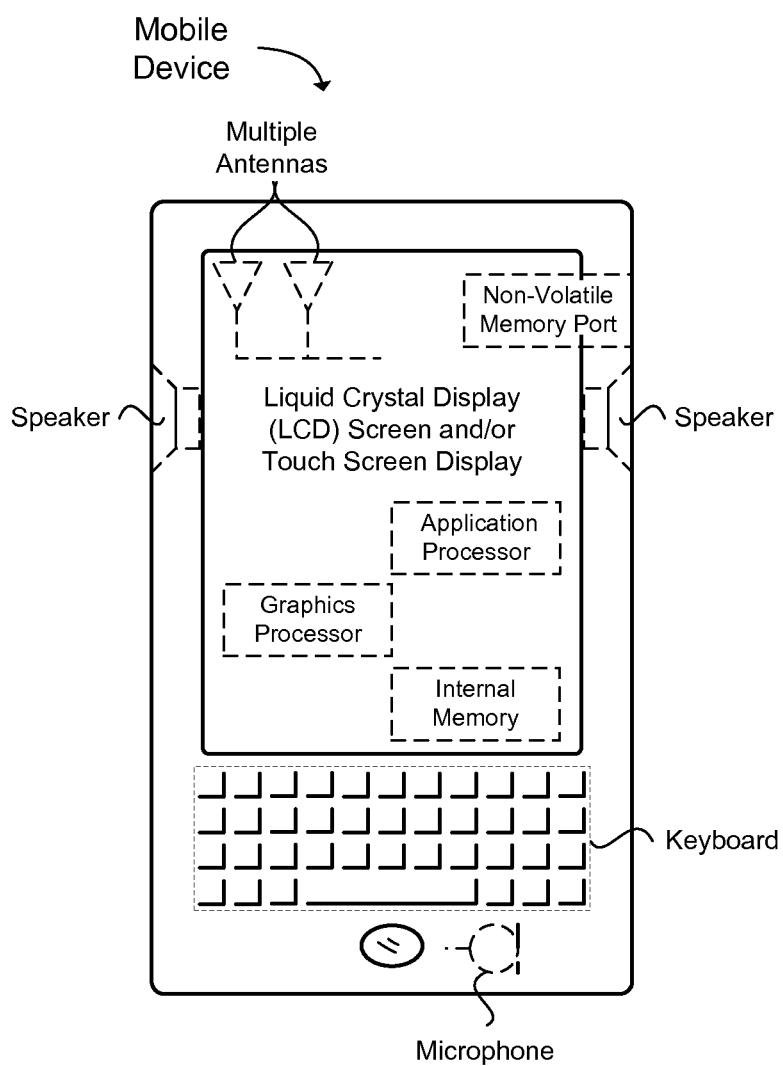
FIG. 7 illustrates a block diagram of a mobile device (e.g., a user equipment) in accordance with an example.

FIG. 7 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 7 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed:

1. A node operable to support small data communications with a user equipment (UE), the node having computer circuitry configured to:
    receive a channel condition indication from the UE, wherein the channel condition indication specifies a channel condition associated with a downlink communication;
    determine a cell load for the node;
    select a radio bearer (RB) type for receiving a small data set from the UE, when the cell load is greater than a threshold, based on the channel condition indication, wherein a signal radio bearer 1 (SRB1) is the selected RB when the channel condition indication is greater than a selected threshold;
    select a modulation and coding scheme (MCS) for receiving the small data set on the SRB1 based on the channel condition indication received from the UE; and
    receive the small data set from the UE using the SRB1.

2. The computer circuitry of claim 1, further configured to select a signaling radio bearer (SRB) or a data radio bearer (DRB) from the RB type for receiving the small data set from the UE based on the channel condition indication.

3. The computer circuitry of claim 2, further configured to select the SRB for receiving the small data set from the UE when the channel condition indication type 1 received from the UE indicates that the UE is located in proximity to a center region of the cell of the node.

4. The computer circuitry of claim 2, further configured to select the SRB for receiving the small data set from the UE when the channel condition indication type 2 received from the UE indicates that the UE has a channel condition that is greater than the selected threshold.

5. The computer circuitry of claim 2, further configured to select the DRB for receiving the small data set from the UE when the channel condition indication received from the UE indicates that the UE is located in proximity to an edge region of the cell of the node.

6. The computer circuitry of claim 2, further configured to select the DRB for receiving the small data set from the UE when the channel condition indication received from the UE indicates that the UE has a channel condition that is less than the selected threshold.

7. The computer circuitry of claim 1, wherein the MCS is selected from one of: a binary phase-shift keying (BPSK)

modulation scheme, a quadrature phase-shift keying (QPSK) modulation scheme, or a quadrature amplitude modulation (QAM) scheme.

8. The computer circuitry of claim 2, further configured to select the SRB for receiving the small data set from the UE based on a last used downlink channel quality indicator (CQI) included in the channel condition indication from the UE.

9. The computer circuitry of claim 1, further configured to receive the channel condition indication in a radio resource control (RRC) connection request message from the UE.

10. The computer circuitry of claim 1, wherein the small data set is less than approximately 1500 bytes.

11. The computer circuitry of claim 1, wherein the node is selected from a group consisting of a base station (BS), a Node B (NB), an evolved Node B (eNB), a baseband unit (BBU), a remote radio head (RRH), a remote radio equipment (RRE), or a remote radio unit (RRU).

12. A method for communicating a small data set between a user equipment (UE) and an evolved node B (eNB), the method comprising:
   determining, at the UE, a channel condition of a downlink channel with the eNB;
   communicating, to the eNB, a channel condition indication based on the channel condition;
   determine a cell load for the eNB;
   transmitting the small data set to the eNB using a signaling radio bearer (SRB), when the cell load is greater than a threshold, based on the channel condition indication, wherein a signal radio bearer 1 (SRB1) is the selected SRB when the channel condition indication is greater than a selected threshold; and
   transmitting the small data set to the eNB over the SRB1 using a modulation and coding scheme (MCS) that is selected by the eNB based on the channel condition indication.

13. The method of claim 12, further comprising transmitting the small data set to the eNB using the SRB when the channel condition indicates that the UE is located in proximity to a center region of a cell of the eNB.

14. The method of claim 12, further comprising:
   communicating, to the eNB, a last used downlink channel quality indicator (CQI) associated with the UE in the channel condition indication; and
   transmitting the small data set to the eNB using the SRB based on the last used downlink CQI in the channel condition indication.

15. The method of claim 12, further comprising transmitting the small data set to the eNB using a data radio bearer (DRB) when the channel condition is less than the selected threshold.

16. The method of claim 12, further comprising transmitting the small data set to the eNB using a data radio bearer (DRB) when the channel condition indicates that the UE is located in proximity to an edge region of a cell of the eNB.

17. The method of claim 12, further comprising communicating, to the eNB, the channel condition indication in a radio resource control (RRC) connection request message.

18. The method of claim 12, wherein the UE includes one or more of an antenna, a touch sensitive display screen, a speaker, a microphone, a graphics processor, an application processor, internal memory, or a non-volatile memory port.

19. A small data communication module at an evolved node B operable to support communications of small data with a user equipment (UE), the eNB comprising:
   one or more processors configured to:
      a receiving module configured to receive a channel condition indication from the UE, wherein the channel condition indication specifies a channel condition associated with a downlink communication;
      a determination module configured to determine a cell load for the eNB;
      a radio bearer selection module configured to select a signaling radio bearer (SRB) for communicating the small data with the UE, when the cell load is greater than a threshold, based on the channel condition indication, wherein a signal radio bearer 1 (SRB1) is the selected RB when the cell load is greater than a threshold;
      a selection module configured to select a modulation and coding scheme (MCS) for communicating the small data over the SRB1 with the UE, wherein the selection module is further configured to select a higher order MCS for communicating the small data on the SRB1 with the UE; and
      a communication module configured to communicate the small data with the UE over the SRB1 using the MCS; and
   a memory configured to interface with the one or more processors and store the MCS.

20. The small data communication module of claim 19, wherein the radio bearer selection module is further configured to select the SRB for communicating the small data with the UE when the channel condition indicates that the UE is located in proximity to a center region of a cell of the eNB.

21. The small data communication module of claim 19, wherein the receiving module is further configured to receive the channel condition indication in a radio resource control (RRC) connection request message from the UE.

* * * * *